United States Patent [19]

Matsui et al.

[11] Patent Number: 4,800,498

[45] Date of Patent: Jan. 24, 1989

[54] ANTI-SKID CONTROL BASED ON DUTY CYCLE ADJUSTMENT

[75] Inventors: Kazuma Matsui, Toyohashi; Yoshiyuki Hattori, Toyoake; Yuuichi Imani, Hamamatsu; Akira Kuno, Oobu; Yoshihisa Nomura, Toyota, all of Japan

[73] Assignees: Nippondenso Co., Ltd., Kariya; Toyota Jidosha Kabushiki Kaisha, Toyota, both of Japan

[21] Appl. No.: 877,729

[22] Filed: Jun. 24, 1986

[30] Foreign Application Priority Data

Jun. 26, 1985 [JP] Japan .................................. 60-142091

[51] Int. Cl.4 ............................................... B60T 8/34
[52] U.S. Cl. .............................. 364/426.02; 303/100; 303/DIG. 4
[58] Field of Search ........................ 364/426; 180/197; 303/95, 97, 99, 100, 102, 105, DIG. 4, 103

[56] References Cited

U.S. PATENT DOCUMENTS

| | | | |
|---|---|---|---|
| 3,637,264 | 1/1972 | Leiber et al. | 303/105 |
| 3,782,783 | 1/1974 | Jones | 303/105 |
| 3,915,508 | 10/1975 | Grosseau | 303/109 |
| 3,953,083 | 4/1976 | Latvala et al. | 303/100 |
| 4,054,328 | 10/1977 | Leiber et al. | 303/103 |
| 4,123,116 | 10/1978 | Carp et al. | 303/DIG. 4 |
| 4,430,714 | 2/1984 | Matsuda et al. | 303/100 |
| 4,615,410 | 10/1986 | Hosaka | 364/426 |
| 4,648,663 | 3/1987 | Nomura et al. | 303/DIG. 4 |

Primary Examiner—Gary Chin
Attorney, Agent, or Firm—Cushman, Darby & Cushman

[57] ABSTRACT

Disclosed is an anti-skid control system incorporated in the hydraulic pressure braking apparatus of a motor vehicle including a wheel braking cylinder responsive to a hydraulic pressure developed by a master cylinder for braking a wheel of the vehicle. The anti-skid control system comprises a hydraulic pressure supplying device and a directional control valve provided between the wheel braking cylinder and the hydraulic pressure supplying device. The directional control valve is actuated to shut off the communication therebetween and the actuation thereof is controlled in accordance with a duty cycle, which is in turn updated in accordance with the difference between a wheel speed and a target wheel speed so that the slip ratio of the wheel becomes equal to a target slip ratio.

11 Claims, 10 Drawing Sheets

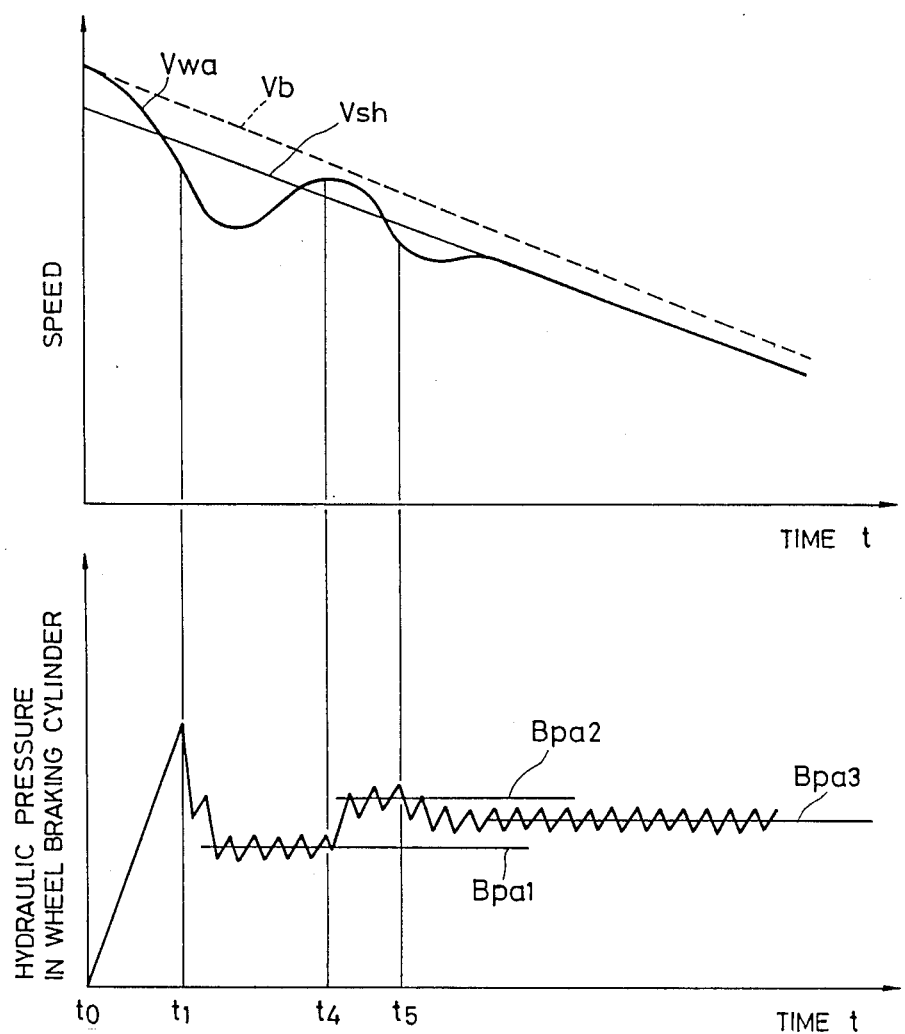

ANTI-SKID CONTROL BASED ON DUTY CYCLE ADJUSTMENT

BACKGROUND OF THE INVENTION

The present invention relates generally to anti-skid control employed for braking of a motor vehicle, and more particularly to an anti-skid control system for optimally controlling a braking hydraulic pressure to each of wheel braking cylinders to prevent the wheels from being locked on braking operation.

Various anti-skid control systems have hitherto been developed with a view to preventing their wheels from falling into a locked condition, i.e., skid condition in excess of a limit of frictional force between the tire and a road surface as a result of a quick braking action of the vehicle.

U.S. Pat. No. 3,637,264 or U.S. Pat. No. 4,054,328, for example, discloses an anti-skid control system wherein a braking pressure to each of wheels is controlled on the basis of parameters derived as a function of a wheel speed so that a slip ratio of the wheel becomes equal to a target slip ratio. However, these prior art systems are arranged to adjust a braking pressure applied to each of the wheels each time in response to variations of road surface conditions and so on, and therefore the variations of wheel speed cover a wide range irrespective of the fact that the vehicle speed has been reduced by a braking operation, resulting in unstable braking control. Furthermore, according to the prior art arrangement, it is required to establish many control conditions in advance to effectively perform the anti-skid control in any vehicle running conditions, resulting in a complex control system.

SUMMARY OF THE INVENTION

It is therefore an object of the present invention is to provide a new and improved anti-skid control system which is capable of reducing the range of variations of wheel speed and simplifying the system arrangement.

In accordance with the present invention, there is provided an anti-skid control system, incorporated in a hydraulic pressure braking apparatus of a vehicle including a wheel braking cylinder responsive to a hydraulic pressure for braking a wheel of the vehicle, comprising a wheel speed detector for detecting the speed of the wheel and generating a signal indicative of the detected wheel speed, a hydraulic pressure supplying device coupled to the wheel braking cylinder for supplying a hydraulic pressure thereto, a directional control valve provided between the hydraulic pressure supplying device and the wheel braking cylinder and actuated to shut off the communication therebetween, and a control unit responsive to the signal from said wheel speed detector. The control unit derives a vehicle speed from the detected wheel speed, determines a target wheel speed on the basis of the derived vehicle speed and a predetermined target slip ratio of the wheel, determines a duty cycle in terms of the actuation of the directional control valve on the basis of the difference between the determined target wheel speed and the detected wheel speed, and controls the switching operation of the directional control valve in accordance with the determined duty cycle. The duty cycle is updated in accordance with variations of the difference therebetween so that the slip ratio of the wheel approaches to the target slip ratio. Namely, the anti-skid control system according to the present invention is based on the duty cycle control of the directional control valve, and the duty cycle is updated in accordance with variations of the wheel speed, and therefore the duty cycle is varied such that the target slip ratio can consequently be obtained without great variations of the wheel speed.

BRIEF DESCRIPTION OF THE DRAWINGS

The object and features of the present invention will become more readily apparent from the following detailed description of the preferred embodiments taken in conjunction with the accompanying drawings in which:

FIG. 9 is a timing chart useful for understanding the anti-skid control according to the present invention.

DETAILED DESCRIPTION OF THE INVENTION

Figure 1:
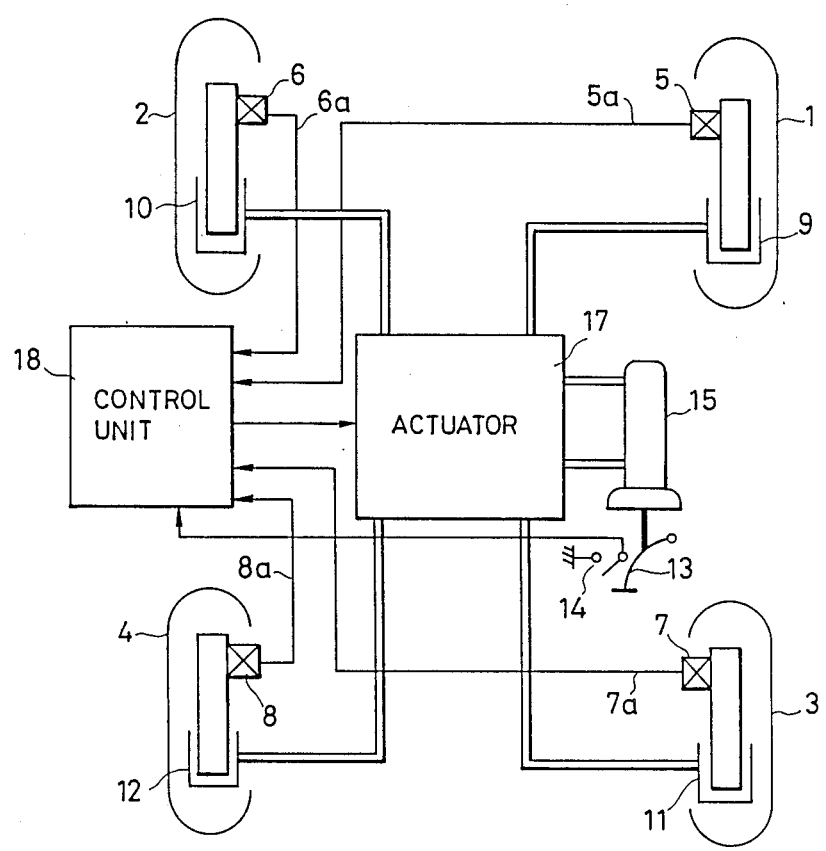
FIG. 1 is a block diagram illustrating an anti-skid control system according to the present invention which is incorporated in the hydraulic pressure braking apparatus of a vehicle.

Referring now to FIG. 1, there is schematically totally illustrated an anti-skid control system according to the present invention incorporated in the hydraulic pressure system of a motor vehicle which includes a master cylinder 15 for generating a hydraulic pressure in response to the operation of a brake pedal 13 and wheel braking cylinders 9 to 12 for respectively performing the braking of each of wheels 1 to 4 of the motor vehicle. The wheel braking cylinder 9 is provided for the front-right wheel 1, the cylinder 10 is provided for the front-left wheel 2, the cylinder 11 is provided for the rear-right wheel 3, and the cylinder 12 is provided for the rear-left wheel 4. Of these, the wheels 1 and 2 are respectively driven by the internal combustion engine of the motor vehicle. Illustrated at numerals 5 to 8 are electromagnetic pickup type or photoelectric transfer type wheel speed sensors for detecting wheel speed and generating signals 5a to 8a indicative of detected wheel speeds which are respectively supplied to a control unit 18 which comprises a microcomputer including a central processing unit (CPU), a read-only memory (ROM), a random access memory (RAM), and so on.

When the brake pedal 13 is operated, a hydraulic pressure corresponding to the operating amount of the brake pedal 13 is generated in the master cylinder 15 and supplied through an actuator 17 to the wheel braking cylinders 9 to 12. The operation of the brake pedal 13 is detected by a stop switch 14 which is located in proximity thereto. The actuator 17 is arranged to adjust the hydraulic pressure from the master cylinder 15 in accordance with control signals from the control unit 18. The master cylinder 15 is coupled to a reservoir 16 for supplying braking oil thereto.

Figure 2:
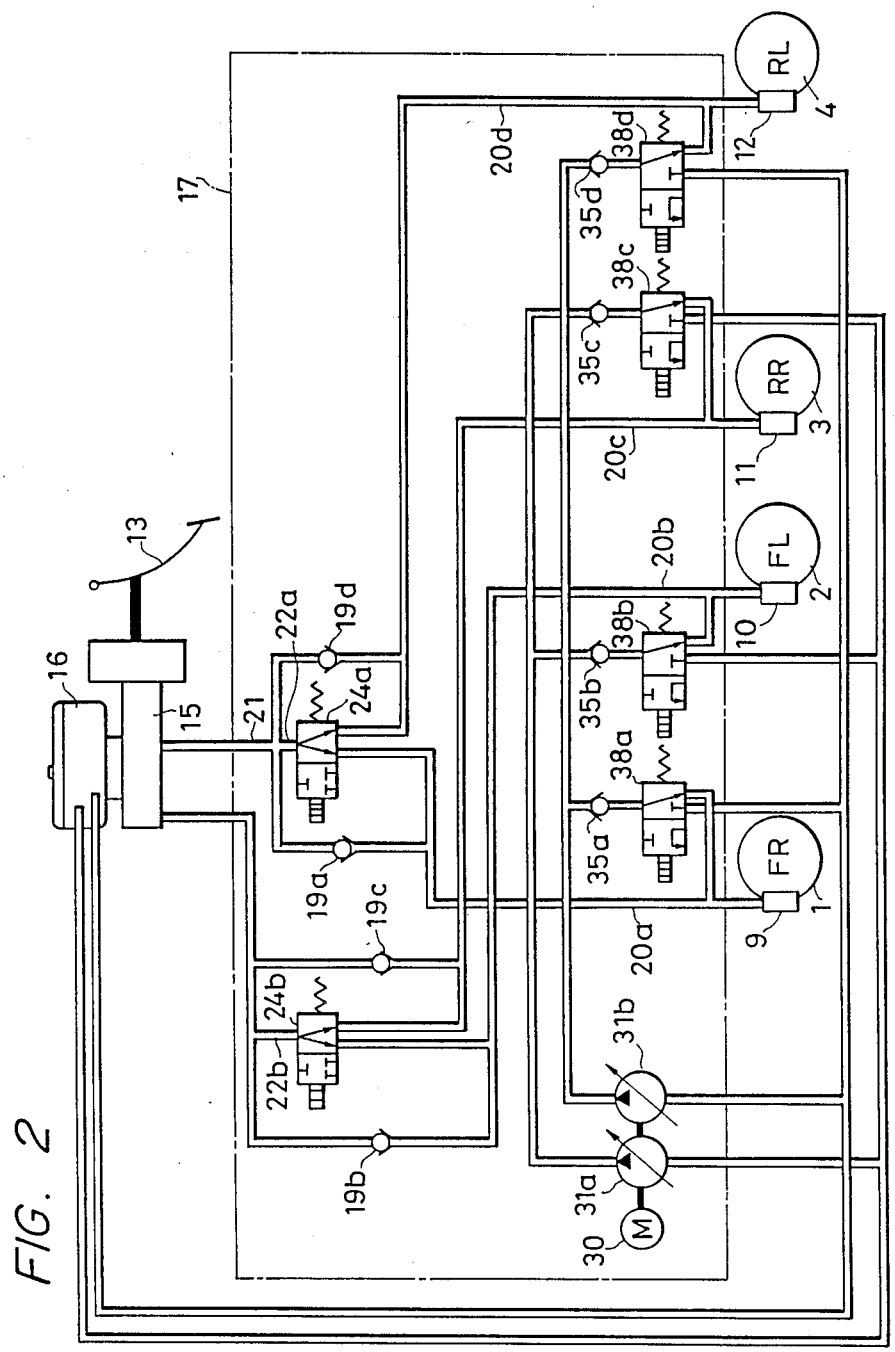
FIG. 2 is an illustration of an actuator for use in the anti-skid control system of this invention.

FIG. 2 is an illustration of the detailed arrangement of the actuator 17. As shown in the figure, the master cylinder 15 is coupled through two-position electromagnetic directional control valves 24a and 24b, respectively provided in pipelines 22a and 22b, and pipe lines 20a to 20d to the wheel braking cylinders 9 to 12. On the other hand, hydraulic pressure pumps 31a and 31b driven by a motor 30 are respectively coupled through check valves 35b, 35c and 35a, 35d and two-position electromagnetic directional control valves 38b, 38c and 38a, 38d to the wheel braking cylinders 9 to 12. The actuator 17 further includes check valves 19a through 19d which are respectively provided between the master cylinder 15 and the pipelines 20a to 20d.

The operation of the actuator 17 will be described with reference to FIGS. 3, 4, 5A and 5B.

Figure 3:
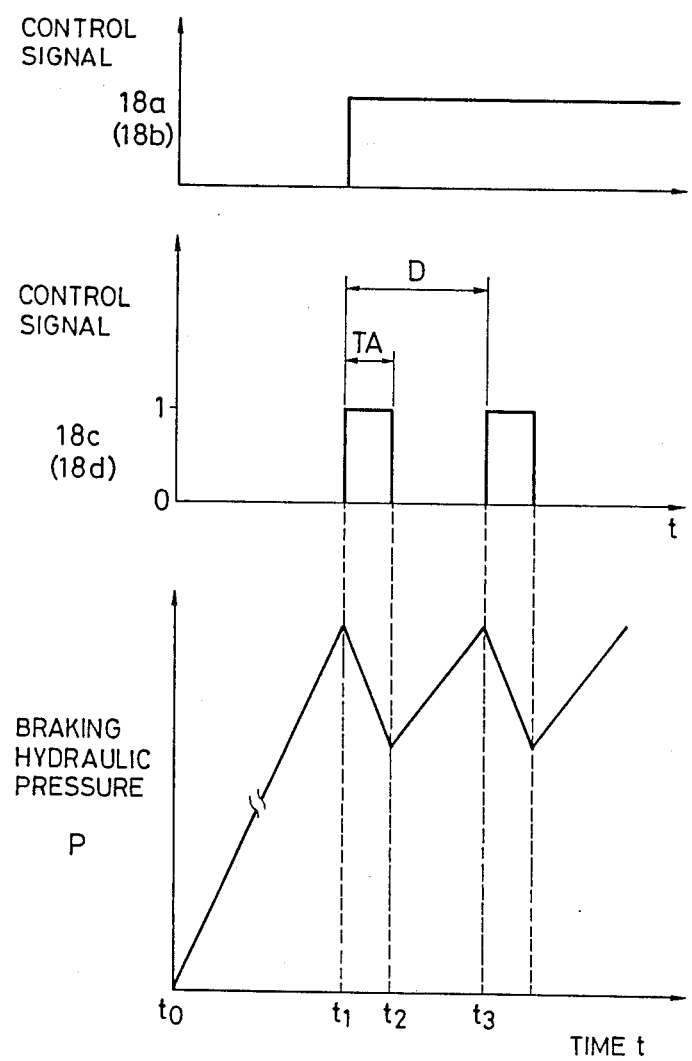
FIG. 3 is a timing chart useful for understanding the anti-skid control system according to the invention.
Figure 4:
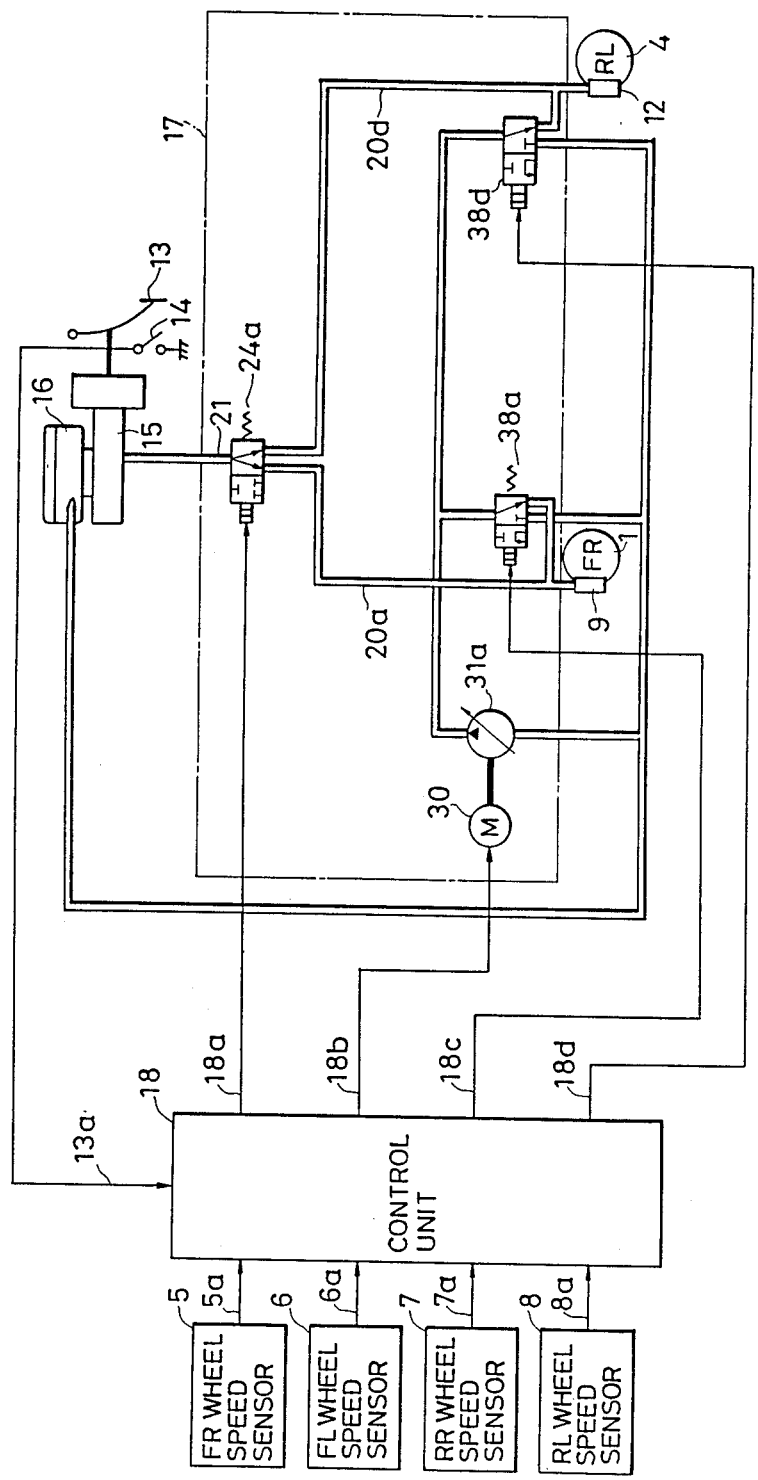
FIG. 4 is a partially illustrated view of the actuator of FIG. 2.

In FIG. 3, the hydraulic pressure in the master cylinder 15 is increased in response to the brake pedal 13 being depressed by a vehicle driver at a time t0 and then the braking system is set to the anti-skid control mode at a time t1 in accordance with demmand from the control unit 18. Before the execution of the anti-skid control, i.e., the time t1, control signals for the anti-skid control are not fed from the control unit 18, and therefore the two-position directional control valves 24a, 24b, 38a to 38d are set as shown in FIG. 4 (partially illustrated) to allow the hydraulic pressure to be directly applied from the master cylinder 15 to the wheel braking cylinders 9 to 12 and the motor 30 is not energized.

Figure 5A:
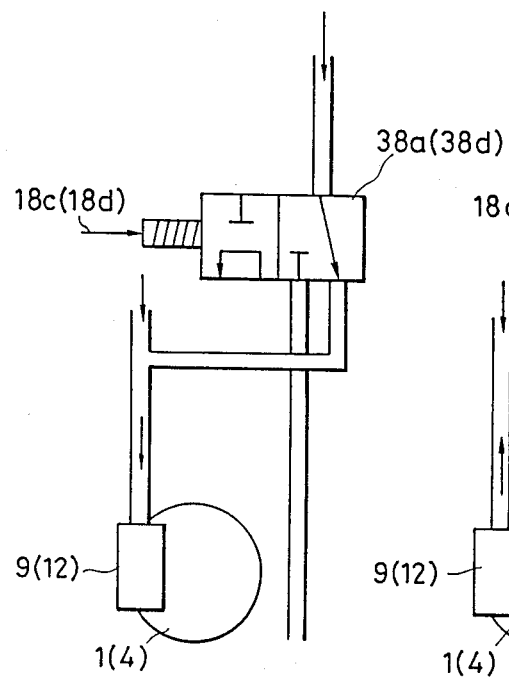
FIGS. 5A and 5B are illustrations for describing the operation of a directional control valve used in the anti-skid control system of the invention.
Figure 5B:
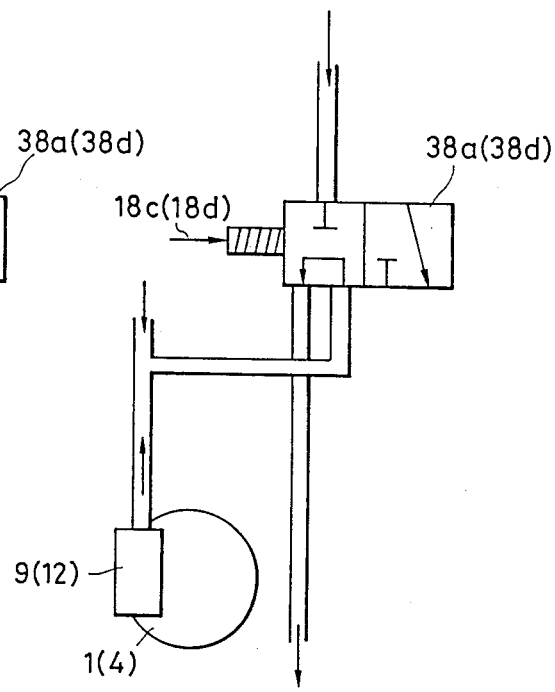

The anti-skid control is started from the time t1 in accordance with the demmand from the control unit 18 which is made on the basis of the signals 5a to 8a from the wheel speed sensors 5 to 8. In this case, the directional control valves 24a and 24b are respectively switched to shut off the communication between the master cylinder 15 and the wheel braking cylinders 9 to 12 in response to command signals (18a in FIG. 4), and the motor 30 is energized in response to a command signal (18b in FIG. 4) to allow hydraulic pressures generated by the pumps 31a and 31b to be supplied through directional control valves 38a to 38d to respective wheel braking cylinders 9 to 12. The hydraulic pressure from the pumps 31a and 31b to each of the braking cylinders 9 to 12 is controlled by the switching operation of each of the directional control valves 38a to 38d. For example, when the directional control valve 38a is switched to the passing-through condition shown in FIG. 5A in response to command signals (18c, 18d in FIG. 4), the hydraulic pressure to the wheel braking cylinder 9 is increased. On the other hand, when it is switched to the cut-off condition shown in FIG. 5A in response to the generation of the command signal being stopped, the hydraulic pressure applied thereto is returned to the reservoir 16 to be decreased. In FIG. 5, the command signal 18c or 18d for driving the directional control valve 38a or 38d is generated during the time period TA between the time t1 and a time t2 and therefore the hydraulic pressure to the wheel braking cylinder 9 or 12 is decreased therebetween. On the other hand, since the command signal is stopped during a time period from the time t2 to a time t3, the hydraulic pressure is increased. This increasing and decreasing control of the hydraulic pressure causes anti-skid control. If the interval D between successive command signals, that is, the time period between the time t1 and the time t3, is set to a constant value (for example, 32 msec), the duty control of the braking hydraulic pressure can be performed by varying the time period TA of generation of the command signal. Therefore, when the time period TA is set to a greater value, the average hydraulic pressure to the wheel braking cylinder is controlled to be decreased. On the other hand, when the time period TA is set to a smaller value, the average hydraulic pressure is controlled to be increased.

Figure 6A:
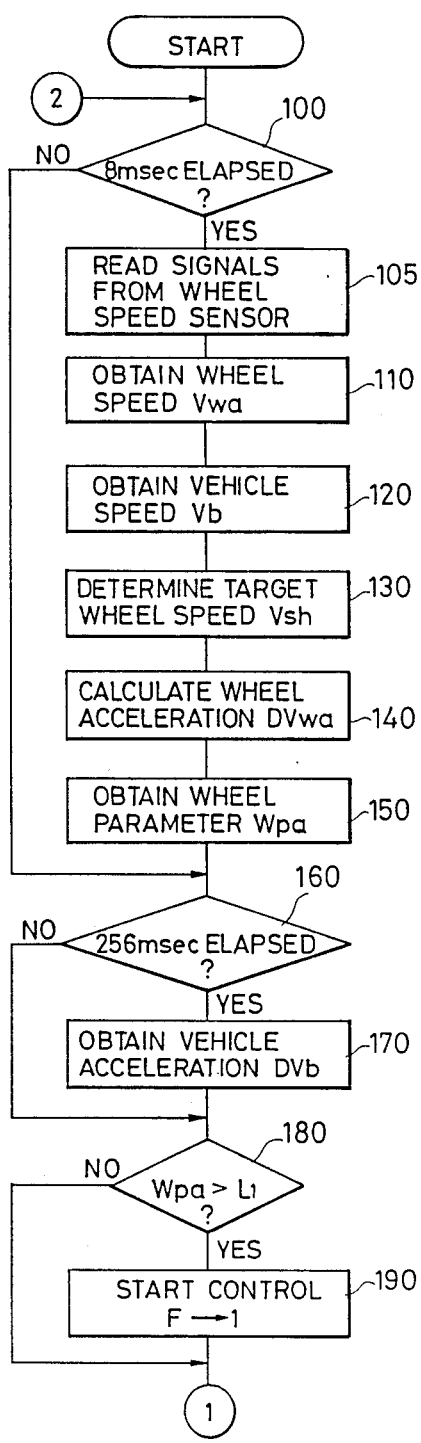
FIGS. 6A, 6B and 7 are flow charts illustrating programs provided for the anti-skid control of this invention.
Figure 6B:
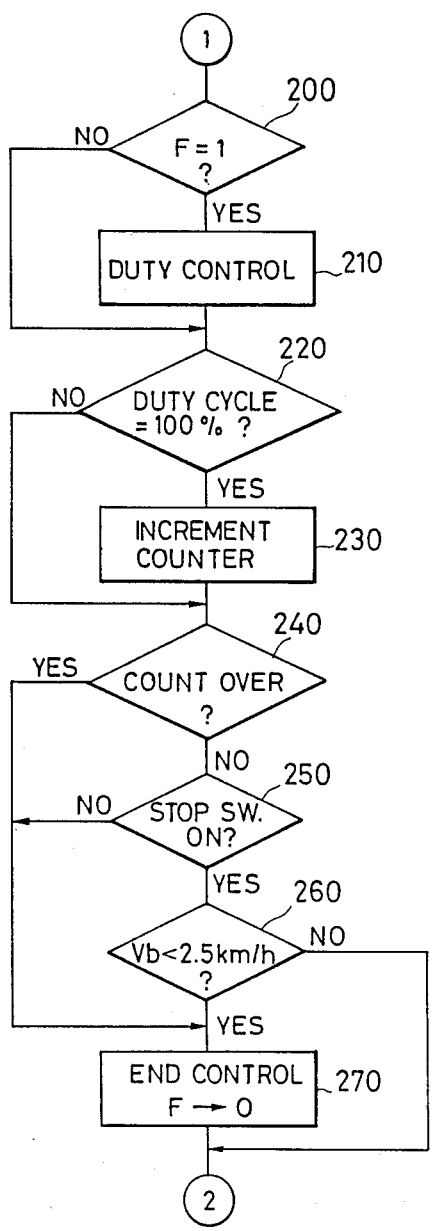
Figure 7:
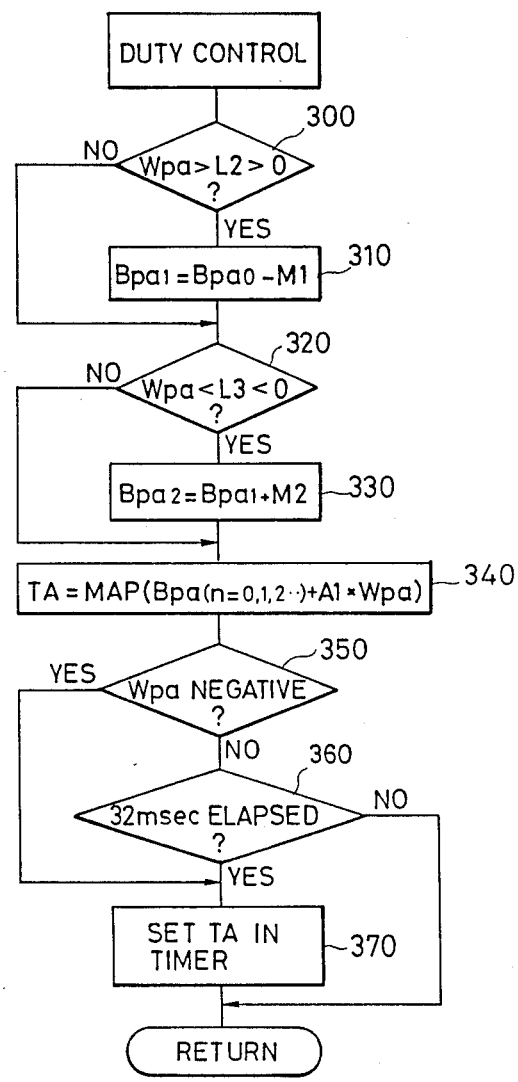

FIGS. 6A, 6B and 7 are flow charts illustrating an anti-skid control performed by the control unit 18.

The control begines with steps 100 and 105 in which detection signals 5a to 8a from the wheel speed sensors 5 to 8 provided for the wheels 1 to 4 are respectively read at equal intervals (for example, 8 msec). The step 105 is followed by steps 110 to 150 for compute respective wheel speeds $V\omega fr$, $V\omega fl$, $V\omega rr$, $V\omega rl$, a vehicle speed, target wheel speeds Vsh, respective wheel accelerations $DV\omega a$, and respective wheel parameters Wpa. The wheel speed of each of the wheels will be hereinafter indicated with subscript a.

The vehicle speed Vb is estimated on the basis of the wheel speed $V\omega a$ (step 120). Namely, the intermediate value Vmed[Vb−K2, Vmax, Vb+K1] among a maximum wheel speed Vmax (=max[$V\omega a$]), values Vb+K1 and Vb−K2 is determined as the estimated vehicle speed Vb (=Vmed). The values Vb+K1 and Vb−K2 are guard speed values for preventing the vehicle speed from resulting in an inappropriate value due to noise or the like, where Vb is a vehicle speed value obtained in the previous time and K1 and K2 are constant. The target wheel speed Vsh is established to a value smaller than the estimated vehicle speed Vb and is determined to obtain an established target slip ratio S given by (Vb−Vsh)/Vb (step 130). Each of the wheel accelerations $DV\omega a$ is calculated by the following equation (1).

$$DV\omega a = (V\omega an - V\omega an-1) - DVb \qquad (1)$$

where: subscript n-1 indicates that the value is of the sampling time immediately before the present time indicated with subscript n (before 8 msec in this case) and DVb represents vehicle acceleration.

The wheel parameter Wpa is obtained in accordance with the following equation (step 150).

$$Wpa = (Vsh - V\omega a + A0 \times DV\omega a)$$

Where: Wpa represents a deviation of the wheel speed $V\omega a$ from the target wheel speed Vsh which is in turn trimmed on the basis of the wheel acceleration $DV\omega a$, and A0 is constant determined in accordance with, for example, the kind of vehicle. The vehicle acceleration DVb is calculated at intervals of 256 msec in accordance with the following equation (2).

$$DVb = Vbn - Vbn-1 \qquad (2)$$

where: subscript n-1 indicates that the value is of the sampling time immediately before the present time indicated with subscript n.

Control goes to a step 180 to check whether the obtained wheel parameter Wpa is greater than constant L1 which is determined in accordance with the kind of vehicle. If the answer in the decision step 180 is affirmative, a subsequent step 190 is followed in which a flag F is set to "1" for starting the anti-skid control.

The operational flow goes to a routine shown in FIG. 6B and a routine of FIG. 7 for performing a duty control of the braking hydraulic pressure as the anti-skid control. FIG. 6B routine is provided for stopping the anti-skid control under predetermined conditions after the start of the anti-skid control (steps 200 and 210). Namely, when a duty cycle, i.e., the ratio of pulses width (time period of generation of command signal from the control unit 18) of the interval between like portions of successive pulses, is 100% which means that the braking hydraulic pressure is continuously increased. The time period of this condition is counted using a counter. If the count value is over a predetermined value, the anti-skid control is stopped (steps 220, 230, 240 and 270). This is for the purpose of stopping the anti-skid control on soft operation of the brake pedal 13 or abnormality of the actuator 17. Furthermore, when the stop switch 14 is turned off and the vehicle speed Vb is below a predetermined value, for example, 2.5 Km/h, the anti-skid control is also stopped (steps 250, 260 and 270). This is for the purpose of stopping the anti-skid control when the vehicle driver has discontinued the braking operation and when the vehicle is actually stopped.

The anti-skid control is performed in accordance with the routine shown in FIG. 7.

Figure 8:
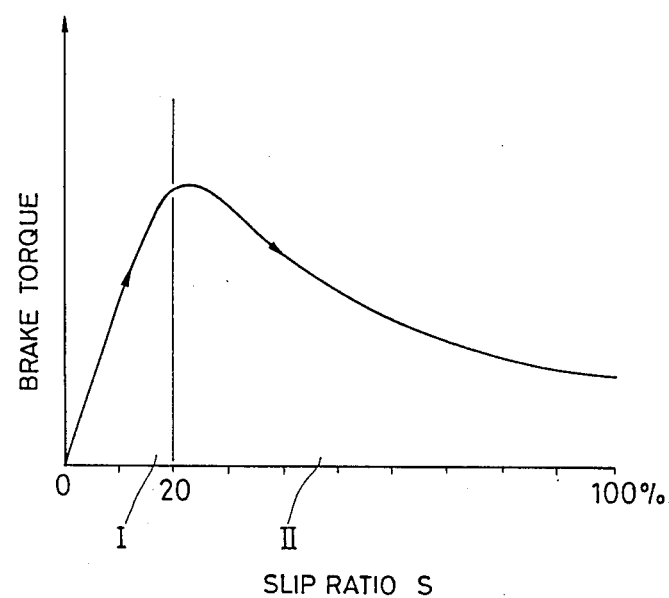
FIG. 8 is a graph showing braking torque plotted as a function of slip ratio.

In anti-skid control, the speed of each of wheels is controlled to maximize the frictional force between a tire and a road surface by causing the slip ratio S to assume 10 to 20%. As shown In FIG. 8, when the slip ratio S is 10 to 20%, the target slip ratio is proportional to the braking torque. Namely, In the region I that the slip ratio S is 0 to 20%, the braking force is increased when the slip ratio S is increased by increasing the braking torque and therefore the target slip ratio is proportional to the braking torque without rapid variations of the wheel speed. On the other hand, in the region II that the slip ratio S exceeds 20%, since the braking force is decreased when the slip ratio is increased by increasing the braking torque, The wheel is instantaneously locked, that is, the slip ratio becomes 100%.

The braking torque is proportional to a hydraulic pressure in a wheel braking cylinder, and the hydraulic pressure can be controlled on the basis of duty cycle. Therefore, it is possible to control the wheel speed to obtain the target slip ratio by performing duty control of the hydraulic pressure in the wheel braking cylinder.

The time period TA corresponding to a duty cycle can be represented as a function of Bpa (%). When Bpa is 100%, the hydraulic pressure is increased with ratio of 100%, that is, the directional control valve is set to the passing-through condition throughout one cycle so that the hydraulic pressure is continuously increased. The initial value Bpa0 of the Bpa is set to 100%.

The anti-skid control shown in FIG. 7 starts with a step 300 in which it is checked whether the wheel parameter Wpa is greater than L2 which is constant. If Wpa>L2, determination is made wherein Bpa is greater than a target value. In accordance with the determination the wheel speed is controlled to be increased. Namely, the target value is estimated to be a value smaller than Bpa0 by M1 and is updated to Bpa1 (=Bpa0−M1) (step 310). Therefore, The time period TA of generation of the control signal is determined as a function of the target value Bpa1 (step 340), i.e., as TA=Bpa1+A1Wpa where A1 is constant. The time period TA is set to a timer (step 370) and a control signal is generated from the control unit 18 to set the directional control valve 38a, 38b, 38c or 38d to the cutt-off condition for the time period TA. Thereafter, when the wheel parameter Wpa is in the range from L3 to L2, i.e., L2>Wpa>L3 (L3<0), the target value Bpa1 is not updated, because the wheel speed is not apt to separate from the target wheel speed Vsh. On the other hand, when the wheel parameter becomes smaller than L3 (step 320), that is, when the wheel speed is apt to separate from the target wheel speed Vsh, detrmination is made wherein Bpa1 is smaller than the target value and the target value is greater than Bpa1 by M2, and the target value is updated to Bpa2=Bpa1+M2 (step 330). The time period TA corresponding to Bpa2 is set as TA=Bpa2+A1Wpa (step 340). The constants M1 and M2 are respectively determined in consideration of the inertia of vehicle and so on to prevent the wheel speed from being rapidly increased or decreased. When Wpa is negative, TA is immediately set in the timer (step 350). When Wpa is positive, TA is set in the timer after elapse of one cycle, i.e., 32 msec (step 360).

According to the above-mentioned anti-skid control, the target value Bpa is updated to corresponds to a road surface condition, and therefore Bpa is controlled to gradually result in a value appropriate to a condition of the road surface on which the vehicle is running.

The anti-skid control according to the present invention will be described in detail with reference to FIG. 9.

The anti-skid control is started at a time t1 in response to reduction of a wheel speed Vωa caused by a braking operation. At the time t1, the target value Bpa is set to Bpa0 (increasing the braking hydraulic pressure with the rate of 100%), However, when Wpa>L2, Bpa is updated from Bpa0 to Bpa1, that is, Bpa is varied so that the average hydraulic pressure in the wheel braking cylinder is decreased. The updating control is performed whenever the wheel speed and wheel acceleration are calculated. However, this description is made on the assumption that Wpa>L2 once occurs at the time t1 and thereafter Wpa is in the range between L2 and L3 until a time t4. The directional control valve 38a, 38b, 38c or 38d is driven in accordance with the duty cycle corresponding TA obtained in accordance with Bpa1+A1×Wpa. A1×Wpa is a trimming value of Bpa1 and is provided for quickly coping with rapid variations of the road surface conditions. For the time period between the time t1 and the time t4, the braking hydraulic pressure is varied about Bpa1.

When Wpa becomes smaller than L3 at the time t4, that is, wheel speed Vωa becomes greater than the target wheel speed Vsh, because Bpa1 is not appropriate, Bpa is updated from Bpa1 to Bpa2 so that the average braking hydraulic pressure is increased. When it is assumed that Wpa is greater than L3 after the time t4 until a time t5, the braking hydraulic pressure is varied about Bpa2 similarly. When Wpa>L2 occurs at the time t5 because Bpa2 is not yet appropriate, Bpa is updated from Bpa2 to Bpa3. When Bpa3 is appropriate to the road surface condition, the update is not performed until the vehicle stops.

In the anti-skid control according to the present invention, the target value Bpa is updated to assume a value appropriate to a road surface condition on tha basis of the variations of wheel speed. Therefore, unlike conventional anti-skid control systems in which the target hydraulic pressure is varied each time in response to the variations of vehicle runing condition, it is not required to previously establish many conditions relating to road surfaces, and therefore the anti-skid control system according to the present invention results in a simple arrangement.

It should be understood that the foregoing relates to only preferred embodiment of the invention, and that it is intended to cover all changes and modifications of the embodiment of the invention herein used for the purpose of disclosure, which do not constitute departures from the spirit and scope of the invention. For example, although in the foregoing description the directional control valves are respectively of two-position type, three-position type directional control valves can be employed for the anti-skid control system according to the present invention. Furthermore, when the two-position type directional control valve is used, it is also appropriate to employ different target values in order to eliminate hysteresis which occurs in response to the switching of the braking hydraulic pressure.

What is claimed is:

1. An anti-skid control system incorporated in a hydraulic pressure braking apparatus of a vehicle at least including a wheel braking cylinder for braking a wheel of said vehicle, comprising:
   means for detecting a speed of said wheel and generating a signal indicative of the detected wheel speed;
   hydraulic pressure supplying means coupled to said wheel braking cylinder for supplying a hydraulic pressure thereto;
   directional control valve means provided between said hydraulic pressure supplying means and said wheel braking cylinder for shutting off a communication therebetween in response to an actuation;
   means for determining a vehicle speed and a wheel acceleration on the basis of the detected wheel speed;
   means for determining a target wheel speed on the basis of the obtained vehicle speed and a predetermined target slip ratio of said wheel;
   means for obtaining a wheel parameter on the basis of the obtained wheel acceleration and a difference between the determined target wheel speed and the detected wheel speed;
   means for determining a duty cycle representing an operating time of said directional control valve means on the basis of the obtained wheel parameter;
   means, for driving said directional control valve means so as to effect the determined duty cycle; and
   means responsive to said wheel parameter obtaining means, for updating the duty cycle to converge to a predetermined value when the obtained wheel parameter is out of a predetermined range with upper and lower limits.

2. An anti-skid control system as claimed in claim 1, wherein said wheel parameter Wpa is derived in accordance with the following equation:

$$Wpa = (Vsh - Vw) + Ao.Dwa$$

where Vsh represents said target wheel speed, Vw designates the detected wheel speed, Dwa is the wheel acceleration and Ao is a constant.

3. An anti-skid control system as claimed in claim 1, wherein the duty cycle is updated to be decreased by a first predetermined value when the obtained wheel parameter is greater than said upper limit and to be increased by a second predetermined value when the obtained wheel parameter is smaller than said lower limit.

4. An anti-skid control system incorporated in a hydraulic pressure braking apparatus of a vehicle at least including a master cylinder for developing a hydraulic pressure in response to the operation of a brake pedal and a wheel braking cylinder responsive to the hydraulic pressure developed by said master cylinder for braking a wheel of said vehicle, comprising:
   means for detecting a speed of said wheel and generating a signal indicative of the detected wheel speed;
   a first directional control valve switched to shut off the communication between said master cylinder and said wheel braking cylinder;
   hydraulic pressure supplying means coupled to said wheel braking cylinder for supplying a hydraulic pressure thereto;
   a second directional control valve provided between said hydraulic pressure supplying means and said wheel braking cylinder for shutting off a communication therebetween in response to an actuation; and
   control means responsive to the signal from said wheel speed detecting means, for;
   (1) deriving a vehicle speed and a wheel acceleration from the detected wheel speed, (2) determining a target wheel speed on the basis of the derived vehicle speed and a predetermined target slip ratio of said wheel,
   (3) deriving a parameter as a function of the wheel acceleration and a difference between the determined target wheel speed and the detected wheel speed,
   (4) comparing the derived parameter with a predetermined value,
   (5) setting said first directional control valve to the shut-off condition when the derived parameter exceeds the predetermined value,
   (6) determining a duty cycle in terms of a time of the actuation of said second directional control valve in accordance with the determined duty cycle.

5. An anti-skid control system as claimed in claim 4, wherein said parameter Wpa is derived in accordance with the following equation:

$$Wpa = (Vsh - Vw) + Ao.Dwa$$

where Vsh represents said target wheel speed, Vw designates the detected wheel speed, Dwa is the wheel acceleration and Ao is a constant.

6. An anti-skid control system as claimed in claim 4, wherein the duty cycle is updated to be decreased by a first predetermined value when the obtained parameter is greater than an upper limit and to be increased by a second predetermined value when the obtained parameter is smaller than a lower limit.

7. An anti-skid control system as claimed in claim 4, wherein said duty cycle is successively updated in response to variations of the parameter so that the target slip ratio is obtained.

8. An anti-skid control system incorporated in a hydraulic pressure braking apparatus of a vehicle at least including a master cylinder for developing a hydraulic pressure in response to the operation of a brake pedal and a wheel braking cylinder responsive to the hydraulic pressure developed by said master cylinder for braking a wheel of said vehicle, comprising:

means for detecting a speed of said wheel and generating a signal indicative of the detected wheel speed;

a first directional control valve selectively switched to a shut off condition to shut off the communication between said master cylinder and said wheel braking cylinder;

hydraulic pressure supplying means coupled to said wheel braking cylinder for supplying a hydraulic pressure thereto;

a second directional control valve provided between said hydraulic pressure supplying means and said wheel braking cylinder and actuated to shut off the communication therebetween; and control means responsive to the signal from said wheel speed detecting means, for:
  (1) deriving a vehicle speed and a wheel acceleration from the detected wheel speed,
  (2) determining a target wheel speed on the basis of the derived vehicle speed and a predetermined target slip ratio of said wheel,
  (3) deriving a parameter as a function of the derived wheel acceleration and the difference between the determined target wheel speed and the detected wheel speed,
  (4) comparing the derived parameter with a first predetermined value,
  (5) switching said first directional control valve to the shut-off condition when the derived parameter exceeds the first predetermined value, and
  (6) determining a duty cycle in terms of a time of the actuation of said second directional control valve,
  (7) comparing the derived parameter with a second predetermined value,
  (8) decreasing the duty cycle by a predetermined correction value when the derived parameter exceeds the second predetermined value, and
  (9) controlling the switching of said second directional control valve in accordance with the decreased duty cycle.

9. An anti-skid control system incorporated in a hydraulic pressure braking apparatus of a vehicle at least including a master cylinder for developing a hydraulic pressure in response to the operation of a brake pedal and a wheel braking cylinder responsive to the hydraulic pressure developed by said master cylinder for braking a wheel of said vehicle, comprising:

means for detecting the speed of said wheel and generating a signal indicative of the detected wheel speed;

a first directional control valve switched to shut off the communication between said master cylinder and said wheel braking cylinder;

hydraulic pressure supplying means coupled to said wheel braking cylinder for supplying a hydraulic pressure thereto;

a second directional control valve provided between said hydraulic pressure supplying means and said wheel braking cylinder and actuated to shut off the communication therebetween; and control means responsive to the signal from said wheel speed detecting means for:
  (1) deriving a vehicle speed and a wheel acceleration from the detected wheel speed,
  (2) determining a target wheel speed on the basis of the derived vehicle speed and a predetermined slip ratio of said wheel,
  (3) deriving a parameter as a function of the derived wheel acceleration and the difference between the determined target wheel speed and the detected wheel speed,
  (4) comparing the derived parameter with a first predetermined value,
  (5) switching said first directional control valve to the shut-off condition when the derived parameter exceeds the first predetermined value,
  (6) determining a duty cycle in terms of the time of the actuation of said second directional control valve,
  (7) comparing the derived parameter with a second predetermined value and reducing the duty cycle by a first correction value when the derived parameter is greater than said second predetermined value,
  (8) comparing the derived parameter with a third predetermined value and enlarging the duty cycle by a second correction value when the derived parameter is smaller than said third predetermined value, and
  (9) controlling the switching of said second directional control valve in accordance with the reduced or enlarged duty cycle.

10. An anti-skid control system as claimed in claim 9, wherein the hydraulic pressure applied to said wheel braking wheel is returned to a reservoir coupled to said master cylinder when said second directional control valve is set to the shut-off condition.

11. A method for performing anti-skid control for a vehicle at least including a master cylinder for developing a hydraulic pressure in response to the operation of a brake pedal and a wheel braking cylinder responsive to the hydraulic pressure developed by said master cylinder for braking a wheel of said vehicle, comprising the steps of:

detecting a speed of said wheel of said vehicle;

deriving a vehicle speed from the detected wheel speed;

determining a target wheel speed on the basis of the derived vehicle speed and a predetermined target slip ratio of said wheel;

calculating a wheel acceleration on the basis of the detected wheel speed;

deriving a parameter as a function of a difference between the determined target wheel speed and the detected wheel speed and the calculated wheel acceleration;

comparing the derived parameter with a first predetermined value;

setting a first directional control valve provided between said master cylinder and said wheel braking cylinder to the shut-off condition when the derived parameter is greater than the first predetermined value;

determining a duty cycle in terms of the time of the actuation of a second directional control valve provided between said wheel braking cylinder and said master cylinder, said second directional control valve being actuated to shut off the communication between said wheel braking cylinder and said master cylinder;

comparing the derived parameter with second and third predetermined values;

updating the duty cycle when the derived parameter is out of a range between said second and third predetermined values; and controlling said second directional control valve in accordance with the updated duty cycle.

* * * * *